April 1, 1958     T. F. JOHNSON     2,828,862
FILTRATION AND SOLVENT SEPARATING SYSTEM
Filed June 16, 1955

INVENTOR.
Theodore F. Johnson
BY
Hyde, Meyer, Baldwin & Doran
ATTORNEYS

United States Patent Office 2,828,862
Patented Apr. 1, 1958

2,828,862

FILTRATION AND SOLVENT SEPARATING SYSTEM

Theodore F. Johnson, Cincinnati, Ohio, assignor to The American Laundry Machinery Company, Cincinnati, Ohio, a corporation of Ohio Application June 16, 1955, Serial No. 515,973

11 Claims. (Cl. 210—82)

The invention relates to methods and means for separating dry cleaning solvent from filter sludge.

An object of the invention is to provide a method and means for filtering the solvent liquid and thereafter cleaning the filter by a reverse-flow operation.

A further object of the invention is to provide a method and means for separating solvent residue from the filter sludge by displacing the said residue with water.

A further object of the invention is to provide a method and means for separating filter-aid sludge from solvent by passing the sludge through an auxiliary filter communicating by valve-controlled means with the main filter.

A further object of the invention is to provide a method and means as defined in the last preceding paragraph in which the separation of the solvent from the sludge in an auxiliary filter is accomplished under pump pressure.

A further object is to accomplish the aforesaid ends by the aforesaid means in suitable combinations of process steps, and appropriate combinations of apparatus units.

A further object of the invention is to provide novel and improved means for the addition of filter aid material at a proper point in the cleaning cycle.

A further object of the invention is to provide a novel and improved arrangement of operating elements for inducing fluid flow through suitably varying channels; for applying pressure to assure such flow; for supplying efficient main filter means and auxiliary filter means; for cleaning said main filter and recovering solvent residue from the filter-aid sludge, and for recovering solvent from the sludge residue, all as will be more fully described hereinafter.

Figure 1:
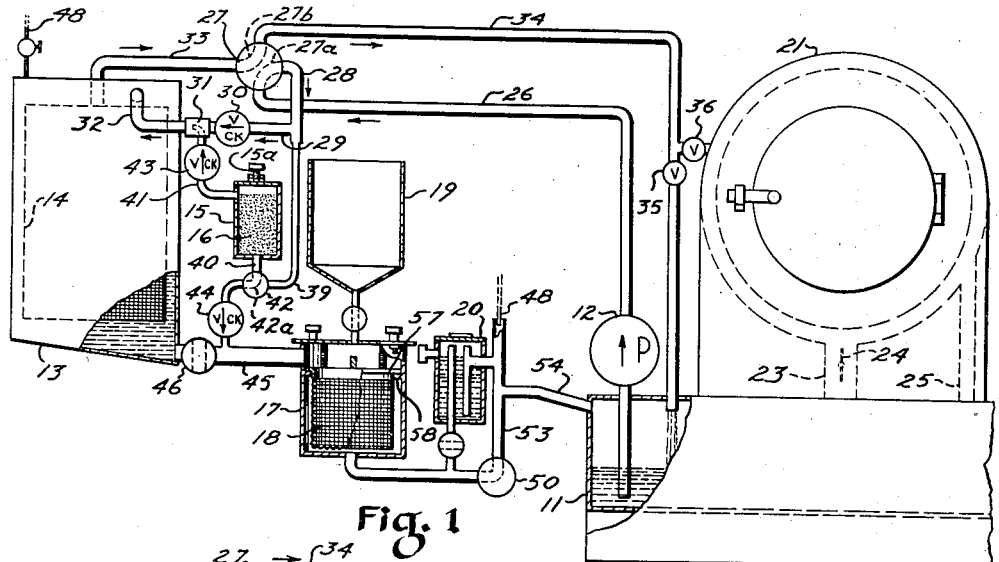

Other objects and advantages of the invention will be apparent from a study of the following description of an embodiment of the invention in conjunction with the accompanying drawings in which, Fig. 1 is a schematic showing of a dry cleaning system incorporating apparatus embodying my invention, and suited for performing the novel process steps to be described.

Figs. 2, 3, 4 and 5 are fragmentary views showing progressive operating positions of part of the apparatus shown in Fig. 1.

Referring first to Fig. 1, my apparatus includes a solvent supply tank 11, a pump 12, a filter housing 13 containing filter means 14, a filter-aid hopper 15 containing filter-aid compound 16, an auxiliary filter housing 17 containing a filtering receptacle 18, a water-dispensing tank 19, a water-solvent separator 20, and suitable interconnecting pipes and valves to be hereinafter more specifically identified. In the interests of clarity I also show a dry cleaning washer 21 having discharge drain 23 controlled by a dump valve 24 and an overflow pipe 25, both drain 23 and pipe 25 being in communication with tank 11, but the washer and its operation form no essential part of the invention.

Still referring to Fig. 1, the pump 12 is impelling solvent liquid through pipe 26, passage 27a of valve 27, pipe 28, pipe 29, check valve 30, filter-aid eductor 31, pipe 32 into housing 13, through filter leaf (or leaves) 14, out through pipe 33, passage 27b of valve 27, and pipe 34 to either tank 11 or washer 21 depending on the condition of valves 35 and 36. It will be apparent that any separatable soil in the solvent thus being circulated will build up on the outside of filter element 14 since the stream direction in this step is from outside to inside.

Figure 2:
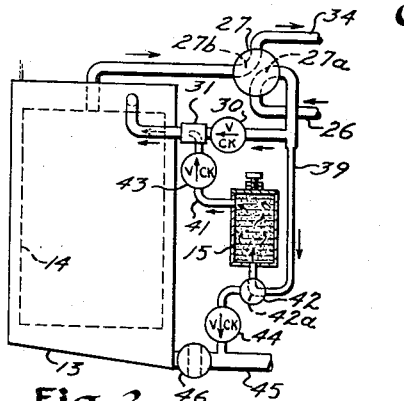

The filter aid hopper 15 is in a parallel flow system including pipes 39, 40, and 41 but flow is stopped at valve 42. At any time that filter aid is desired on filter leaf 14, and usually in starting, valve 42 is turned so that its passage 42a establishes communication between pipe 39 and pipe 40, as shown in Fig. 2, whereupon a portion of the solvent stream proceeds through pipe 39, valve 42, pipe 40, into filter-aid hopper 15 to form a slurry, which then proceeds through pipe 41, check valve 43, and eductor 31 into the main stream. Filter-aid compound is thus deposited on the filter leaf 14. The hopper 15 can be replenished at any time by turning valve 42 until its passage 42a is as shown in Fig. 1 and then removing the cover plate of hopper 15, whereupon any liquid in the hopper drains through valve 42, check valve 44, filter drain pipe 45 into the secondary filter chamber 17. During such drainage the valve 46 remains closed. When the hopper 15 is replenished, the cover 15a is replaced.

Ordinarily a smaller amount of filter-aid powder is added for each load of work run during the day, and in each case the procedure is the same, except that in the pre-coating, when starting, a larger amount of filter aid is used than in successive coatings during a continuing sequence of cleaning batches. Any air which is carried with the solvent from hopper 15 into housing 13, or which may be trapped in said housing during refilling etc., clears through the filter vent line 48. Line 48 has a valve 49 which can be used to open the line just enough to permit air to escape, with possibly a slight trickle of solvent. Pipe 48 can discharge in any convenient receptacle but, as indicated in Fig. 1, it is here shown as discharging downwardly into a pipe 53, and thereby eventually into the supply tank 11. The top of pipe 53 is open, which serves to vent the solvent separator.

Figure 3:
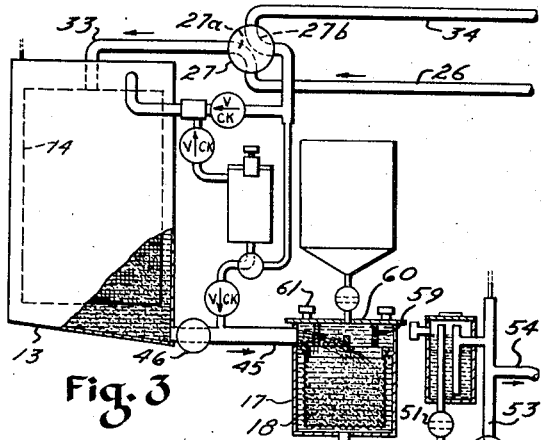
Figure 4:
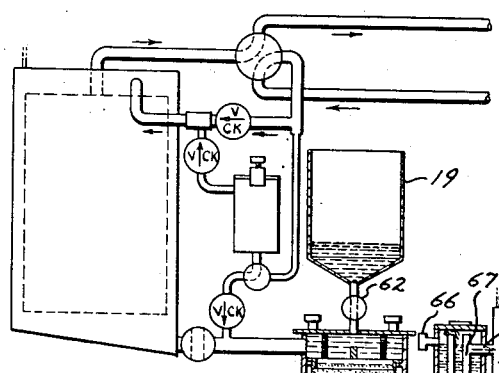

At periodic intervals, or whenever it appears that an undesirable amount of filter cake and dirt has been built up on the filter leaves, they are back-washed by reverse flow of the solvent through the filter, this step being illustrated in Fig. 3. Valve 46 is first opened to institute solvent flow from filter chamber 13 through pipe 45 into auxiliary filter chamber 17. Valve 27 is then reversed from the position shown in Figs. 1 and 2 to the position shown in Fig. 3. As can be seen, rotation of the valve approximately 90° in either direction will accomplish the desired purpose, but I have shown the valve in Fig. 3 with passage 27a now establishing solvent flowing directly from pipe 26 to pipe 33 and into the interior of filter leaf 14, flushing of the accumulated material, including soiled filter aid, from the exterior of the leaf and through valve 46 and pipe 45 into chamber 17 and auxiliary filter receptacle 18. Valves 50 and 51 being turned as shown in Fig. 3, the filtered solvent flows through pipe 52, valve 50, and pipes 53 and 54 back to solvent supply tank 11. The auxiliary filter receptacle or basket 18 may be formed of fine wire filter mesh like that of the main filter 14 or it may consist of a fabric lining inside a coarse mesh basket. If desired the side wall of the basket could be solid, with a perforated bottom. Any suitable structure will suffice so long as it traps the sludge in basket 18.

The upper edge of basket 18 has an annular transverse flange 57 which seats on an internal flange 58 on housing 17 and is held firmly on its seat by compression springs 59 to avoid passage of suspended sludge back to the supply tank. The auxiliary filter housing 17 is tightly sealed by a cover 60 retained by screws 61, so that housing 17 really provides a pressure filter since the incoming liquid receives its pressure impetus from pump 12. This arrangement, in conjunction with the maintaining of a solvent-filled main filter, as compared to a draineddown gravity backwash, provides a quick backwashing operation so as to permit an immediate resumption of normal operation of filter 13. In addition the simultaneous existence of hydrostatic pressure on the outside and inside of filter leaves 14 greatly reduces the tendency for distension and damage of the filter mesh during reverse flow.

When the sludge has been flushed from filter 14, valves 27 and 46 are turned back to the Fig. 1 position and the filter is thereby placed in normal operation.

It is now desired to displace residual solvent from the filter and sludge in chamber 17. For this purpose, and referring to Fig. 4, valve 50 is turned to closed position and valves 62 and 51 are opened. The water container 19 is placed a foot or so above housing 17 and water-solvent separator 20 and when valves 62 and 51 are opened, as aforesaid water flows slowly downwardly either by gravity, as shown, or otherwise under slight line pressure, into housing 17, displacing the heavier solvent through pipes 52 and 64, and into separator 20. The solvent then enters the lower end of vertical pipe 67 and thence passes through the horizontal discharge passage 67a, and thus back into main supply tank 11. The lighter water upon entry to the separator 20 rises immediately and discharges through passage 66. The displacement of solvent by the water should be slow enough to avoid churning or turbulence of the water-solvent liquid phases to avoid intermixture. A definite line of demarcation of these phases is indicated by the broken horizontal lines in the auxiliary filter chamber of Fig. 4. The amount of water originally placed in receptacle 19 may be calculated as sufficient to displace the solvent from the sludge, and from the piping associated with the auxiliary filter housing. The system here shown is especially adapted for solvents heavier than water, such as perchlorethylene. Those skilled in the art can revise the disposition and arrangement of the various elements to provide for a system in which the density of the solvent is less than that of water.

Figure 5:
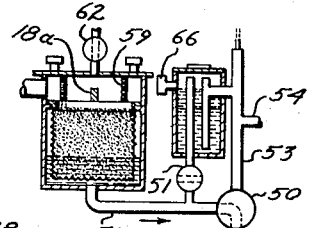

When the solvent has been displaced from the sludge, valve 51 is closed and valve 50 is turned to the position shown in Fig. 5. The water drains from the sludge in filter basket 18, and from housing 17, dropping downwardly from valve 50 into any suitable receptacle or bucket thereunder. The lid of separator 20 is removable and the liquid in the bucket may be poured in, whereupon separated water will flow out water discharge passage 66 and solvent will go out through passage 67. The auxiliary filter housing 17 is then opened and the filter basket with its damp, solvent-free sludge is removed by means of its handle 18a. When the empty basket is replaced, valve 50 is reset to the position of Fig. 1.

What I claim is:

1. A method of recovering water-immiscible solvent from filter and sludge, comprising the steps of backwashing the sludge from the filter by reverse flow of solvent through said filter, intercepting said sludge in an auxiliary filter, and passing water through the sludge in said auxiliary filter to displace solvent from the sludge.

2. A method of recovering water-immiscible solvent of a density greater than water from filter aid sludge, comprising the steps of backwashing the sludge from the filter by reverse flow of solvent through said filter, intercepting said sludge in an auxiliary filter, and passing water downwardly through the sludge to displace solvent downwardly from the sludge, by super-imposing an overlying body of water above and upon said sludge.

3. A method as defined in claim 2 including, in combination therewith, the further step of separating the displaced solvent phase from any water carried therewith.

4. In a method of filtration of a water-immiscible solvent wherein a main filter intercepts soil from said solvent in the form of filter and sludge, the steps comprising backwashing the sludge, under pressure, through an auxiliary filter whereby the sludge is accumulated in said auxiliary filter, displacing the solvent from the solvent-carrying sludge with water, and thereafter separating the solvent and the water phases.

5. In a method of filtration of a water-immiscible solvent having a density greater than water wherein a main filter intercepts soil from said solvent in the form of filter aid sludge, the steps comprising backwashing the sludge, under pressure, through an auxiliary filter whereby the sludge is accumulated in said auxiliary filter, displacing the solvent downwardly from the solvent-carrying sludge with water, by superimposing an overlying body of water upon said sludge, and thereafter separating the solvent and the water phases.

6. In a dry cleaning system using a liquid solvent immiscible in water, and having a density greater than water, the steps comprising circulating solvent under pressure through a main filter, at intervals reversing the flow of solvent through said main filter while maintaining the pressure to backwash filter aid sludge from said main filter, intercepting said sludge in an auxiliary filter while still maintaining said pressure, and displacing solvent downwardly from said sludge in said auxiliary filter by superimposing an overlying body of water upon said sludge.

7. A method as defined in claim 6 including, in combination therewith, the further step of separating the displaced solvent phase from any water carried therewith.

8. In a dry cleaning system using a water-immiscible solvent having a density greater than water, solvent filtration means including a main filter, primary flow control means for normally directing a stream of solvent through said main filter from an entry side to a discharge side including a pump for maintaining said stream under pressure, an auxiliary filter chamber, an auxiliary filter in said chamber, by-pass means normally rendered inoperative for establishing liquid flow communication between the entry side of said main filter and said chamber, secondary flow control means for reversing said stream and for simultaneously rendering said by-pass means operative whereby the stream is caused to flow from the discharge side of said main filter through said main filter and thence to and through said chamber and said auxiliary filter while maintaining said pump pressure so as to backwash filter sludge from said main filter into said auxiliary filter, and means for delivering water to the upper end of said chamber whereby to provide an overlying layer of water above said sludge, and means for withdrawing downwardly displaced solvent from the sludge in said auxiliary filter.

9. Filtration means as defined in claim 8 wherein further means is provided for separating the displaced solvent phase from any water carried therewith from said auxiliary filter chamber.

10. In a dry cleaning system, using a water-immiscible solvent of a density greater than water, solvent purification means including a main filter housing having a main filter element therein, means for normally directing a stream of solvent into said filter housing and through said main filter element from an inlet side thereof to an outlet side thereof including a pump for maintaining said stream under pressure, discharge means for normally permitting discharge of filtered solvent from said main filter housing, an auxiliary filter housing including an auxiliary filter element, by-pass means normally rendered inoperative, but, when operative, permitting solvent flow from said main filter housing, on the inlet side of said main filter element, to said auxiliary filter housing, and means for reversing normal solvent flow through said main filter housing whereby solvent is introduced through said discharge means and caused to pass, under pump pressure from said outlet side through said main filter element to said inlet side thereof, and means for simultaneously rendering said by-pass means operative whereby solvent with entrained filter sludge separated from the inlet side of said main filter element is thereupon backwashed into said auxiliary filter housing, under pump pressure, and said sludge is intercepted by said auxiliary filter element, means for delivering water to the upper end of said auxiliary filter housing whereby to provide an overlying layer of water above said sludge, and for simultaneously rendering said by-pass means inoperative, and means for withdrawing displaced solvent downwardly from said auxiliary filter housing.

11. Solvent purification means as defined in claim 10 wherein additional means is provided for separating the solvent phase from the water phase.

References Cited in the file of this patent

UNITED STATES PATENTS

| | | |
|---|---|---|
| 1,524,916 | Demme | Feb. 3, 1925 |
| 1,604,650 | Manning | Oct. 26, 1926 |
| 2,020,693 | Manley | Nov. 12, 1935 |
| 2,286,432 | Monsarrat | June 16, 1942 |

UNITED STATES PATENT OFFICE
CERTIFICATE OF CORRECTION

Patent No. 2,828,862                        April 1, 1958

Theodore F. Johnson

It is hereby certified that error appears in the printed specification of the above numbered patent requiring correction and that the said Letters Patent should read as corrected below.

Column 3, line 64 and column 4, line 8, for "filter and sludge", each occurrence, read --filter aid sludge--.

Signed and sealed this 8th day of July 1958.

(SEAL)
Attest:

KARL H. AXLINE
Attesting Officer

ROBERT C. WATSON
Commissioner of Patents